United States Patent Office 3,539,651
Patented Nov. 10, 1970

3,539,651
CATALYTIC DEHYDROGENATION PROCESS
Harold J. Hepp and E. O. Box, Jr., Bartlesville, Okla., assignors to Phillips Petroleum Company, a corporation of Delaware
No Drawing. Filed Nov. 14, 1967, Ser. No. 683,017
Int. Cl. C07c 5/18
U.S. Cl. 260—680
8 Claims

ABSTRACT OF THE DISCLOSURE

Dehydrogenatable alkanes, cycloalkanes, arylalkanes, and certain substituted alkanes, and particularly n-butane, are dehydrogenated (in 1 or 2 stages) in the absence of free $O_2$ and diluted with steam to less saturated hydrocarbons with a catalyst composite including (a) zinc aluminate or copper aluminate, (b) nickel or a platinum metal, and (c), when (a) is copper aluminate, an alkalizing metal oxide, and when (a) is zinc aluminate, copper oxide.

---

This invention relates a process for dehydrogenating alkanes, cycloalkanes, arylalkanes, and substituted alkanes, in which a stable nitrogen-containing heterocyclic radical has been substituted for a hydrogen, diluted with steam in contact with a steam active catalyst.

It is conventional in the dehydrogenation of paraffin hydrocarbons to utilize catalysts such as nickel-kieselguhr, chromium oxide-alumina, zinc oxide-alumina, platinum-alumina, and the like. In general, prior art processes are operated with a water-free feed stock and at a low pressure. Considerable advantages are inherent in any process that can operate with steam. For instance, heat of reaction can readily be supplied. Coke deposition on the catalyst can be retarded. Expensive compression of products can be avoided since elevated pressures can be employed and steam can readily be condensed after dehydrogenation is effected. For reasons such as these, various attempts have been made to employ steam in processes for the dehydrogenation of paraffin hydrocarbons. One of the most successful catalysts to effect this result is broadly disclosed in U.S. 3,168,587 wherein a platinum catalyst on a support such as zinc aluminate is disclosed to be one possible catalyst for the dehydrogenation of paraffin hydrocarbons in the presence of steam but it requires oxygen in the reaction zone.

Accordingly, it is an object of the invention to provide an improved process for the dehydrogenation of paraffin hydrocarbons to the corresponding less saturated hydrocarbons in the presence of steam and in the absence of oxygen using catalysts which are active for extended periods in the presence of steam. Another object of the invention is to provide a process for the dehydrogenation of dehydrogenatable saturated hydrocarbons in admixture with steam to control the amount of coke deposition on the catalyst, using steam insensitive catalysts. Other objects of the invention will become apparent to one skilled in the art upon consideration of the accompanying disclosure.

Similar steam active catalysts for the dehydrogenation of saturated hydrocarbons are disclosed in our copending application S.N. 615,078, filed Feb. 10, 1967, now abandoned, and in the continuation-in-part application thereof U.S. Pat. 3,461,183 issued on Aug. 12, 1969.

We have now found other highly active catalysts for the dehydrogenation of steam-diluted alkanes, cycloalkanes, arylalkanes, and substituted alkanes in which a stable nitrogen-containing heterocyclic radical has been substituted for a hydrogen. Hence, a broad aspect of the invention comprises dehydrogenating one or more of these compounds in admixture with steam and in the absence of free oxygen under dehydrogenating conditions with a catalyst composite initially including the following components:

(a) a major amount of one of the group copper aluminate and zinc aluminate;
(b) a minor but effective amount of a metal or a reducible compound of a metal of the group nickel, platinum, palladium, ruthenium, iridium, rhodium, osmium, and mixtures thereof, and
(c) when component (a) is copper aluminate, at least one compound of a metal of Group Ia or Group IIa in an amount in the range of 0.5 to 10 weight percent of component (a) and sufficient to impart to said composite a pH of at least 8, and when component (a) is zinc aluminate, an amount of copper oxide in the range of 0.3 to 10 weight percent of the composite in lieu of said metal compounds of Group Ia and Group IIa.

Thus, we have found that copper oxide in the composite either in the alumina spinel or in admixture with zinc aluminate spinel in which the composite also includes the alkylizing metal oxide, provides exceptionally good activity and catalyst life in the dehydrogenation of the specified hydrocarbon compounds.

The Periodic Table referred to herein is that published in the Chemical Rubber Company's Handbook of Chemistry and Physics, 45th edition (1964), page B–2.

The catalysts of our invention can be prepared by combining, in any manner known to the art, certain Group VIII metal or metal compounds capable of reduction including nickel, platinum, ruthenium, palladium, iridium, rhodium, osmium, and mixtures thereof, with a base or support consisting essentially or principally of zinc aluminate or copper aluminate. When the base or support is copper aluminate, one or more of the alkylizing metal oxides of Group Ia and Group IIa are included. Generally, the Group VIII metal or metal compound is incorporated in the base or support prior to treating the resulting composite with at least one alkali or alkaline earth metal compound, such as sodium hydroxide, potassium carbonate, lithium hydroxide, barium acetate, barium hydroxide, calcium oxide, and the like, so as to impart to the resulting deposite an alkaline pH of at least 8. The Group VIII metal content of the catalyst should be in the range of 0.1 to 5 weight percent of the support or base, preferably 0.25 to 1 weight percent. In this disclosure, the term "weight percent of the support or base" means parts by weight per hundred parts of the support or base by weight. Sufficient alkali or alkaline earth metal compound or compounds are used to neutralize the acid sites of the catalyst composite, including the metal and support, to render the composite alkaline, and to activate the catalyst for the dehydrogenation of steam-diluted alkanes, etc. The optimum amount of each alkali or alkaline earth metal compound or combination of compounds for each supported metal catalyst must be determined experimentally, but usually an amount in the range of 0.1 to 10 weight percent of the total catalyst is effective. However, sufficient alkaline material must be employed to impart an alkaline pH with at least 8 to the catalyst.

When utilizing zinc aluminate as component (a) of the composite, copper oxide is incorporated in the composite as component (c). It has been found that copper oxide can be substituted for or used in lieu of the alkali or alkaline earth metal oxides or hydroxides to render the catalyst highly efficient and effective in the dehydrogenation of alkanes, etc., in the presence of steam and in the absence of free oxygen. The amount of copper oxide employed is in the range of 0.3 to 10 weight percent of the carrier or base, i.e., component (a), and an amount in the range of 2.5 to 6 weight percent is preferred.

The ratio of steam to hydrocarbon used in the dehydrogenation process is in the range of 0.5 to 1 to 30 to 1.

As disclosed in U.S. Pat. 3,461,183 catalysts made in accordance with the invention, using platinum compounds free of non-volatile radicals have longer life in the dehydrogenation process than catalysts containing platinum deposited in the composite from compounds containing non-volatile radicals. Such compounds are well known and are enumerated in aforesaid application.

The catalyst systems of the invention are employed at temperatures between 750 and 1250° F., preferably between 1000 and 1100° F., and pressures in the range of 0 to 500 p.s.i.g., preferably 0 to 250 p.s.i.g. Total space velocity (GHSV) of hydrocarbon and steam is in the range of 100 to 50,000, preferably in the range of 500 to 20,000 volumes of gas per volume of catalyst per hour (32° F., 15 p.s.i. absolute pressure).

The modified catalyst of the invention are particularly well adapted to the dehydrogenation of alkanes, cycloalkanes, and arylalkanes containing from 2 to 12 carbon atoms. These hydrocarbons include ethane, propane, butanes, octanes, dodecanes, cyclohexane, cyclododecane, cyclopentane, ethylbenzene, n-butylbenzene, and the like. In addition, compounds that optionally contain a stable heterocyclic moiety such as pyridyl, piperidyl, and the like, substituted for a hydrogen of such hydrocarbons are effectively dehydrogenated with our modified catalyst in the presence of steam and in the absence of oxygen. Examples of such substituted compounds include 3-ethylpyridene, 4-propylpyridene, 3-n-butylpiperidene, and the like. The spinel form of the base or carrier (copper aluminate or zinc aluminate) prepared by coprecipitation from aqueous solutions of the selected salts are preferred to mere mixtures of the oxides because of their higher conversion activity and selectivity for olefins. Spinels, as referred to herein, are compounds of formula $M(AlO_2)_2$ or $MOAl_2O_3$ wherein M is zinc or copper.

In one embodiment of the invention, $C_3$ to $C_{12}$ paraffin hydrocarbons such as n-butane, n-pentane, isopentane, and the like are dehydrogenated to the corresponding diolefins, i.e., 1,3-butadiene, 1,3-pentadiene, isoprene, and the like, the dehydrogenation being effected in first and second dehydrogenation zones in series. In this operation, steam and steam active catalyst of the invention are used in the first zone. The effluent from the first zone, including steam, hydrogen, olefin, diolefin, and unreacted paraffin, is passed to the second zone where it is contacted with a steam-active olefin dehydrogenation catalyst.

In order to illustrate the invention, the following non-limiting examples are presented.

EXAMPLE I

A copper aluminate, prepared by coprecipitation from solutions of copper nitrate and sodium aluminate was calcined at 1000° F. A portion of this copper aluminate in 10–20 mesh size was then steam-treated at 1000° F. to stabilize the surface area. A 30 cc. portion (32.8 grams) of this 10–20 mesh copper aluminate was impregnated with 0.5 weight percent platinum and 4.5 mol percent barium oxide (using barium acetate solution). The resulting composite was reduced in $H_2$ at 1000–1060° F., initially, although reduction is not required after subsequent regenerations. The resulting catalyst was used in a fixed bed reactor in the dehydrogenation of n-butane. The data obtained in this operation are set forth in the table below.

TABLE I

| | | | After regeneration | |
|---|---|---|---|---|
| Hrs. on stream | 2.0 | 8.0 | 11.0 | 17.0 |
| ° F | 1,007 | 1,031 | 1,016 | 1,008 |
| $H_2O/nC_4$ ratio | 4.2 | 4.4 | 4.4 | 4.4 |
| GHSV, total | 4,840 | 4,840 | 4,850 | 4,850 |
| P.s.i.g | 85 | 85 | 85 | 80 |
| Conversion, percent | 35.6 | 29.7 | 31.2 | 26.5 |
| Selectivity, percent | | | | |
| Cracking | 8.5 | 10.0 | 6.1 | 6.0 |
| Water gas | 2.1 | 2.9 | 1.7 | 1.3 |
| $C_4''$ plus $C_4''''$ | 89.4 | 87.1 | 92.2 | 92.7 |

The conversion, high selectivity for butenes and butadiene, and the high level of activity after regeneration obtained in the use of the copper aluminate catalyst of the example fully demonstrate the superior quality of the catalyst.

EXAMPLE II

A zinc aluminate spinel ($ZnO/Al_2O_3$ ratio of 1/1) was prepared by the addition of 216 ml. of 28 percent ammonium hydroxide in 1000 ml. of water to 5000 ml. of aqueous solution containing 119 gm. of zinc nitrate (hydrated) and 300 gm. of aluminum nitrate (hydrated) with vigorous stirring. The resulting gel was allowed to stand 1 hour and was then filtered in Buchner funnels. The filter cake was washed repeatedly to remove the ammonium nitrate then was dried under heat lamps. After drying and sieving to 8–20 mesh, the zinc aluminate was heated to 1000° F. in air for several hours. The calcined spinel was then soaked in aqueous $PtCl_4$ such that 0.5 weight percent platinum based on the spinel was adsorbed. The catalyst was again dried under a heat lamp and was then impregnated with 5.0 weight percent CuO from copper acetate solution. The resulting composite was reduced in $H_2$ at about 1000° F. for about 1 hour. The resulting catalyst was used in the dehydrogenation of n-butane. A run under similar conditions was made using another portion of the same zinc aluminate spinel impregnated with 0.5 percent Pt and 4.5 mol percent barium oxide. The data obtained in the runs are presented in Table II below:

TABLE II

| | | After regeneration | $ZnAl_2O_4/0.5$ Pt plus 4.5 BaO |
|---|---|---|---|
| Hrs. on stream | 5.0 | 11.5 | 15.5 |
| ° F | 1,005 | 1,012 | 1,012 |
| $H_2O/nC_4$ ratio | 4.2 | 4.5 | 4.4 |
| GHSV, total | 4,890 | 4,820 | 4,850 |
| P.s.i.g | 88 | 90 | 85 |
| Conversion, percent | 29.1 | 25.3 | 25.0 |
| Selectivity, percent: | | | |
| Cracking | 6.6 | 6.9 | 7.5 |
| Water gas | 2.8 | 3.0 | 3.3 |
| $C_4''$ plus $C_4''''$ | 90.6 | 90.1 | 89.2 |

The data in Table II clearly demonstrate the equivalency of copper oxide and barium oxide as modifiers of a zinc aluminate spinel impregnated with platinum, in n-butane dehydrogenation.

Certain modifications of the invention will become apparent to those skilled in the art and the illustrative details disclosed are not to be construed as imposing unnecessary limitations on the invention.

That which is claimed is:

1. A process for dehydrogenating a compound which is an alkane, cycloalkane, arylalkane, or substituted alkane in which a stable nitrogen-containing heterocyclic radical has been substituted for a hydrogen, which comprises contacting at least one said compound in admixture with steam in a mol ratio of steam to compound in the range of 0.5:1 to 30:1 and in the absence of free oxygen under dehydrogenating conditions with a catalyst composite including components:
- (a) a major amount of copper aluminate or zinc aluminate;
- (b) a catalytic amount of a metal or a reducible compound of a metal of nickel, platinum, palladium, ruthenium, iridium, rhodium, osmium, or mixtures thereof; and
- (c) when component (a) is copper aluminate, at least one compound of copper oxide in the range of 0.3 to 10 weight percent of the composite or a metal of Group I$a$ or Group II$a$ in an amount in the range of 0.5 to 10 weight percent of component (a) and sufficient to impart to said composite a pH of at least 8, and when component (a) is zinc aluminate, an amount of copper oxide in the range of 0.3 to 10 weight percent of the composite.

2. The process of claim 1 wherein component (a) comprises copper aluminate spinel, component (b) comprises platinum, and component (c) comprises barium oxide.

3. The process of claim 2 wherein said hydrocarbon comprises n-butane.

4. The process of claim 1 wherein component (a) is a copper aluminate spinel, component (b) is platinum in a concentration in the range of 0.1 to 1.0 weight percent of component (a), and component (c) is barium oxide in a concentration in the range of 2.5 to 6 weight percent of component (a).

5. The process of claim 4 wherein said hydrocarbon comprises n-butane.

6. The process of claim 1 wherein component (a) comprises zinc aluminate spinel, component (b) comprises platinum, and component (c) comprises copper oxide.

7. The process of claim 6 wherein said hydrocarbon comprises n-butane.

8. The process of claim 6 wherein the concentrations of components (b) and (c) in weight percent of component (a) are in the range of 0.1 to 1.0 and 2.5 to 6, respectively, and said hydrocarbon is principally n-butane.

References Cited

UNITED STATES PATENTS 3,168,587    2/1965    Michaels et al. _____ 260—683.3

PAUL M. COUGHLAN, JR., Primary Examiner

U.S. Cl. X.R.

252—466; 260—666, 683.3, 696